(12) United States Patent
Bomma et al.

(10) Patent No.: US 10,691,545 B2
(45) Date of Patent: *Jun. 23, 2020

(54) MODIFYING A CONTAINER INSTANCE NETWORK

(71) Applicant: International Business Machines Corporation, Armonk, NY (US)

(72) Inventors: Shashidhar Bomma, Hyderabad (IN); Neeraj Kumar Kashyap, Vinayak Nagar (IN); Ginni Gidwani, Bangalore (IN); Pramod V. Gavali, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,505

(22) Filed: Jul. 17, 2019

(65) Prior Publication Data
US 2019/0340074 A1 Nov. 7, 2019

Related U.S. Application Data

(63) Continuation of application No. 15/819,140, filed on Nov. 21, 2017.

(51) Int. Cl.
 *G06F 11/14* (2006.01)
 *G06F 9/455* (2018.01)
 *G06F 9/4401* (2018.01)

(52) U.S. Cl.
CPC ...... *G06F 11/1417* (2013.01); *G06F 11/1471* (2013.01); *G06F 9/4401* (2013.01); *G06F 9/45558* (2013.01); *G06F 2009/45562* (2013.01); *G06F 2009/45575* (2013.01); *G06F 2201/805* (2013.01); *G06F 2201/82* (2013.01)

(58) Field of Classification Search
CPC ..... G06F 11/07; G06F 11/076; G06F 11/0727
USPC ....................................................... 714/47.2
See application file for complete search history.

(56) References Cited

U.S. PATENT DOCUMENTS

| | | | |
|---|---|---|---|
| 8,386,838 B1 * | 2/2013 | Byan | G06F 11/1484 714/5.11 |
| 8,688,965 B2 * | 4/2014 | Rothman | G06F 9/4416 713/1 |
| 8,738,781 B2 | 5/2014 | Heim et al. | |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Kamini B Patel
(74) *Attorney, Agent, or Firm* — Heslin Rothenberg Farley & Mesiti P.C.; Michael Petrocelli, Esq.

(57) ABSTRACT

A method, computer program product, and system includes a processor(s) progressively recording data modifications to an object (e.g., a virtual resource or a container), in an in-memory resource of the shared computing environment. Based on receiving an indication of a system failure or a system reboot, the processor(s) writes the data modifications to a non-volatile storage resource, where the non-volatile storage resource is readable by an object manager communicatively coupled to the non-volatile storage resource, and where the object manager utilizes the data modifications to recover the object at reboot following the system failure.

8 Claims, 5 Drawing Sheets

(56) References Cited

U.S. PATENT DOCUMENTS

| | | | |
|---|---|---|---|
| 9,122,562 B1* | 9/2015 | Stickle | G06F 8/71 |
| 9,591,094 B2 | 3/2017 | Eicher et al. | |
| 9,697,504 B2* | 7/2017 | Spitz | G06Q 20/0855 |
| 9,864,609 B1* | 1/2018 | McClure | G06F 9/4418 |
| 10,019,323 B1* | 7/2018 | Bai | G06F 16/184 |
| 2008/0082627 A1* | 4/2008 | Allen | G06Q 10/10 |
| | | | 709/217 |
| 2015/0074362 A1* | 3/2015 | Mohl | G06F 3/0667 |
| | | | 711/162 |
| 2016/0072910 A1* | 3/2016 | Eicher | H04L 67/2842 |
| | | | 709/213 |
| 2017/0214634 A1* | 7/2017 | Li | G06F 9/5077 |
| 2018/0332073 A1* | 11/2018 | Ahmed | G06F 9/45558 |
| 2019/0042325 A1* | 2/2019 | Nair | G06F 11/00 |
| 2019/0188070 A1* | 6/2019 | Das | G06F 11/0706 |

OTHER PUBLICATIONS

List of IBM Patents or Patent Applications Treated as Related, Jul. 23, 2019, 2 pages.

* cited by examiner

MODIFYING A CONTAINER INSTANCE NETWORK

BACKGROUND

Various tools can be utilized to manage cloud computing resources, one example is OpenStack, which is a set of software tools for building and managing cloud computing platforms for public and private clouds. OpenStack includes Nova, which is a component within the OpenStack open source cloud computing platform developed to provide on-demand access to computing resources by provisioning and managing large networks of virtual machines (VMs). Thus, Nova provides a way to provision computing instances (e.g., VMs, including virtual servers). Nova supports creating virtual machines and has limited support for system containers. Nova runs as a set of daemons on top of existing Linux servers to provide that service. However, Nova, and other software tools developed to aid in cloud computing resource management, face performance-related challenges when tasked with becoming active after a reboot, because of the large inventory of VMs that a given component within the computing environment is responsible for provisioning and managing within that cloud computing environment.

SUMMARY

Shortcomings of the prior art are overcome and additional advantages are provided through the provision of a method for rebooting an object in a shared computing environment with a local memory resource after a system failure. The method includes, for instance: progressively recording, by one or more processors, data modifications to an object, wherein the object is selected from the group consisting of a virtual resource and a container, in a shared computing environment, in an in-memory resource of the shared computing environment; and based on receiving an indication of a system failure or a system reboot, writing, by the one or more processors, the data modifications to a non-volatile storage resource, wherein the non-volatile storage resource is readable by an object manager communicatively coupled to the non-volatile storage resource, and wherein the object manager utilizes the data modifications to recover the object at reboot following the system failure.

Shortcomings of the prior art are overcome and additional advantages are provided through the provision of a computer program product for rebooting an object in a shared computing environment with a local memory resource after a system failure. The computer program product comprises a storage medium readable by a processing circuit and storing instructions for execution by the processing circuit for performing a method. The method includes, for instance: progressively recording, by one or more processors, data modifications to an object, wherein the object is selected from the group consisting of a virtual resource and a container, in a shared computing environment, in an in-memory resource of the shared computing environment; and based on receiving an indication of a system failure or a system reboot, writing, by the one or more processors, the data modifications to a non-volatile storage resource, wherein the non-volatile storage resource is readable by an object manager communicatively coupled to the non-volatile storage resource, and wherein the object manager utilizes the data modifications to recover the object at reboot following the system failure.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
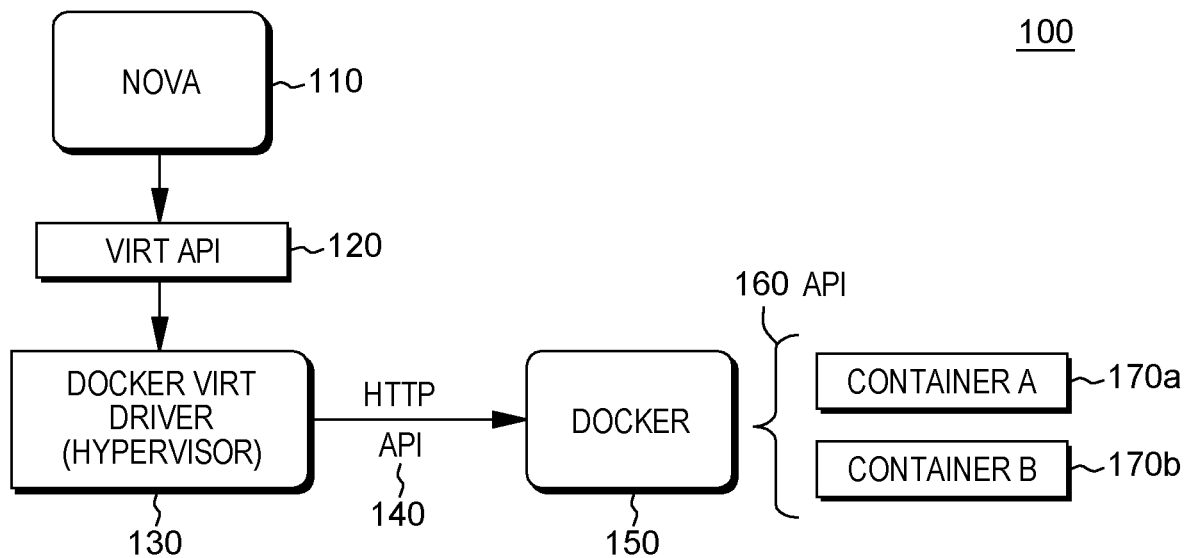
FIG. 1 is an illustration of various aspects of a technical environment in which aspects of embodiments of the present invention may be implemented.

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
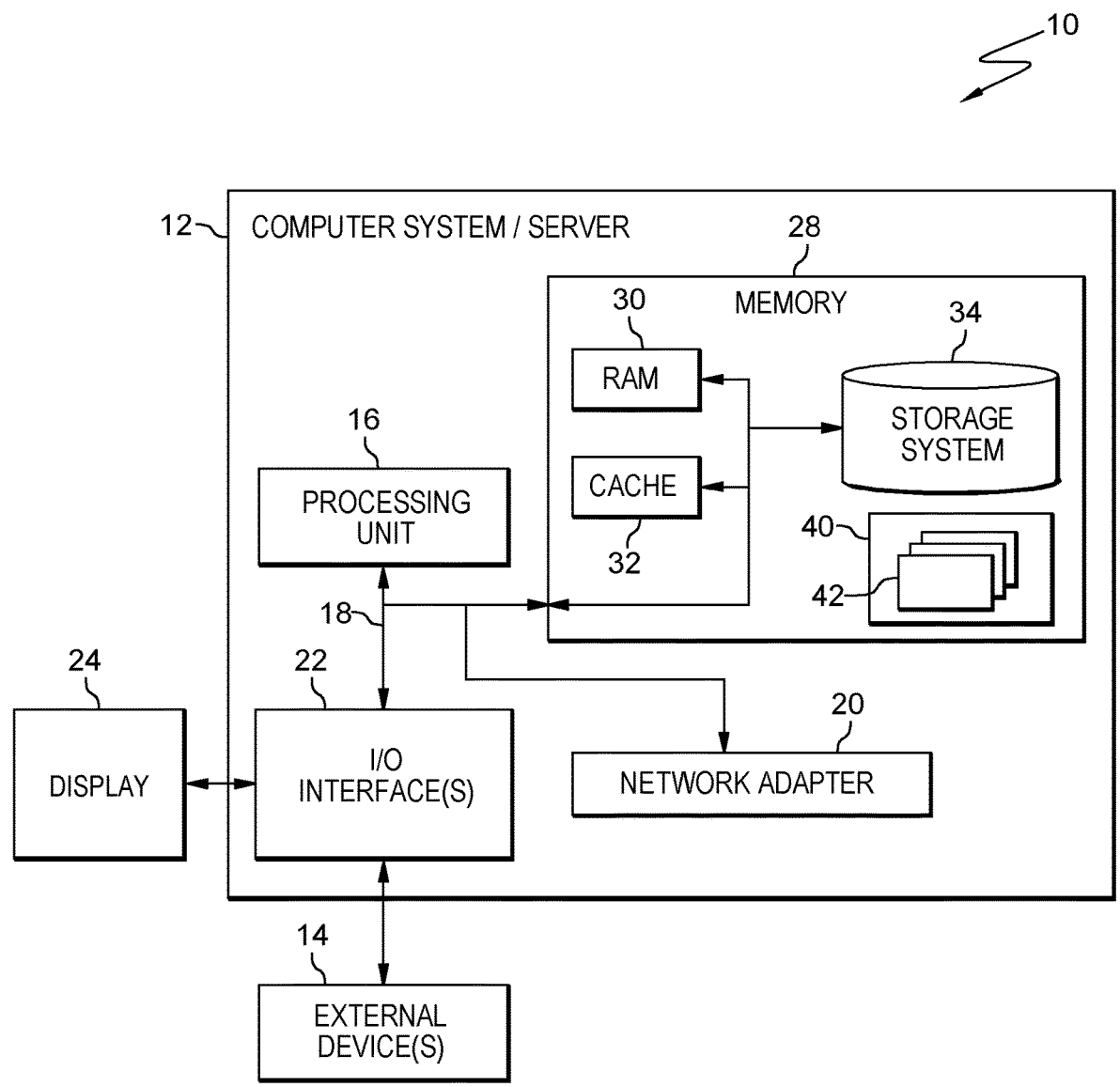
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28. The terms container and virtual machine are used interchangeably throughout this paper. Although there are differences between these objects, aspects of embodiments of the present invention are applicable to both objects, which is reflected by the use of both terms throughout.

Systems and services that manage computing resources in multiple user environments (shared computing environments), including distributed computing environments and cloud computing environments, may distribute resources to users of the environment in part by creating and terminating virtual machine (VM) instances through a hypervisor. A hypervisor or virtual machine monitor (VMM) is computer software, firmware, and/or hardware, which creates and runs virtual machines. A computer on which a hypervisor runs one or more VMs can be referred to as a host machine, and each VM can be referred to as a guest machine. In some technical environments, in order to create and terminate VMs, one or more programs communicate with a hypervisor, for example, through an application programming interface (API). The one or more programs may comprise a worker daemon. As a daemon, the one or more programs run as a background process, rather than being under the direct control of an interactive user, and can automatically assist in provisioning resources of the distributed computing environment by creating and terminating VMs.

One non-limiting example of a software that manages shared computing environments, in this case cloud computing environments, is OpenStack. OpenStack includes Nova, one or more programs that provide on-demand access to computing resources by provisioning and managing large networks of virtual machines. A Nova daemon called nova-compute creates and terminates VMs by communicating with a hypervisor through an API. In existing environments, in order to manage VMs, this daemon accepts actions from a queue and performs a series of system commands, including but not limited to, launching a Kernel-based Virtual Machine (KVM) instance and updating its state in the database. OpenStack, Nova, and nova-compute are utilized herein as examples for the sole purpose of illustrating various aspects of the present invention to one of skill in the art. However, aspects of embodiments of the present invention are applicable across various technical environments.

Aspects of embodiments of the present invention address the boot time of virtual workloads. As such, aspects of embodiments of the present invention represent improvements to existing computing technology and are inextricably tied to computing. In existing systems, programs like nova-compute, which provision and manage large networks of VMs in shared computing environments, take a long time to become active after the system is rebooted because of the overhead associated with the large inventory of VMs the programs manage. This lag in service can be problematic to an end user. Embodiments of the present invention provide an improvement to shared computing environments, such as cloud computing environments, because the implementation of aspects of embodiments of the present invention into these computing environments enable one or more programs that provision and manage VMs to become active again, following a reboot, with negligible downtime. Because existing systems are unable to provide this limited recovery time, customers may be unable to utilize promised resources for extended periods of time, impacting the efficacy and the efficiency of the computing environment as a whole.

Unlike existing systems, embodiments of the present invention provide a high probability of fast boot times for virtual workloads without increasing risks to data integrity, even in the event of a system failure and/or reboot. In order to limit the downtime of VMs following a system failure and/or reboot, embodiments of the present invention include one or more programs that provision and manage these VMs progressively record modifications to data in an in-memory area of a system resource and transfer these modifications to non-volatile memory (NVM) when the one or more programs detecting a system failure. The one or more programs read data written to the NVM in order to perform a system recovery (e.g., a reboot). The one or more programs apply the data to a hypervisor driver, to enable a faster reboot.

FIG. 1 is an example of portion of a technical environment 100 into which certain aspects of the present invention may be implemented. To illustrate these aspects, OpenStack is utilized to manage a cloud computing environment. However, as understood by one of skill in the art, aspects of embodiments of the present invention are applicable across various shared computing environments. In FIG. 1, Nova 110, which provisions VMs, communicates with Docker Driver 130, the driver of the hypervisor (i.e., the VMM), through a virtualization API 120. The Docker Driver 130 is a hypervisor driver for Openstack Nova Compute (i.e., nova-compute). The Docker 150, driven by Docker Driver 130 provides management of containers 170a-170a with an API 160, providing a lightweight solution that runs processes in isolation. A Docker container 170a-170b includes a software component along with all of its dependencies: binaries, libraries, configuration files, scripts, virtualenvs, jars, gems, tarballs, etc. One or more programs comprising Nova 110 enable Docker 150 to manage multiple containers on a single machine. One or more programs comprising Nova 110 run as a background process and enable Docker 150 to manage several hosts, which in turn may manage hundreds of containers.

Figure 2:
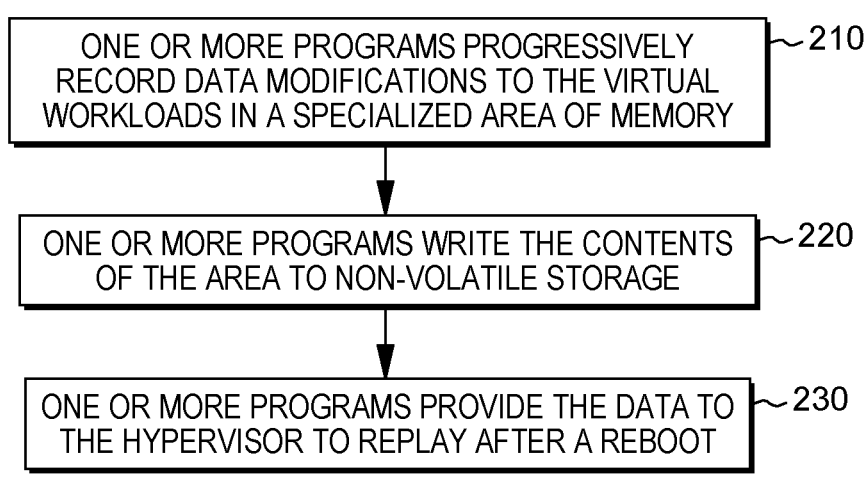
FIG. 2 is a workflow illustrating certain aspects of an embodiment of the present invention.

FIG. 2 is a workflow 200 of certain aspects of an embodiments of the present invention utilized to enable one or more programs that provision VMs in a shared computing environment, including a cloud computing environment, to become active with limited downtime after a system failure. The one or more programs are therefore available to the virtual workloads (e.g., VMs) managed by the one or more programs quickly, without introducing data integrity issues. For example, in some embodiments of the present invention, the one or more programs comprise OpenStack nova-compute.

Referring to FIG. 2, in some embodiments of the present invention, one or more programs progressively record data modifications to the virtual workloads (e.g., VMs) in a specialized area of memory (210). For example, in a specific cloud computing environment, during normal operations, the one or more programs record modifications to a container instance network in an in-memory area. The specialized area of memory may be a dedicated and/or a shared resource that is accessible to the one or more programs.

After system failure, the one or more programs write the contents of the area to non-volatile storage (220). The writing of the data by the one or more programs may be accomplished during an available window (e.g., during a system dump). This timing is possible because system failures do not result in immediate loss of system function. In some embodiments of the present invention, the one or more programs detect a system failure and/or reboot, and write the in-memory area out to a non-volatile space, including but not limited to, non-volatile random-access memory (NVRAM), a flash memory, magnetoresistive random access memory (MRAM), and/or dynamic random-access memory (DRAM). In some embodiments of the present invention, the one or more programs process data written to the in-memory area, for example, to reduce write-out time by removing redundant records.

Based on copying the data to the non-volatile storage, the one or more programs provide the data to the hypervisor to replay after a reboot (230). For example, in an embodiment of the present invention in a computing environment that includes OpenStack, the one or more programs read the data written to the non-volatile storage, and apply the data to nova docker driver, enabling faster reboot of VMs and limiting the downtime for customer containers.

The workflow 200 illustrates at least two aspects of embodiments of the present invention that limit downtime of VMs following a system failure and/or reboot: 1) one or more programs executing on at least one processing circuit in embodiments of the present invention consistently record modifications/changes (to data) in a special in-memory area (e.g., FIG. 2, 210) and transfer these modifications to non-volatile memory (NVM) (e.g., FIG. 2, 220), on detecting system failure, without introducing data integrity issues; and 2) one or more programs enable a faster reboot of VMs by reading data written to NVM and utilizing the data to perform a system recovery (i.e., reboot) by applying the data to the VMM (e.g., FIG. 2, 230).

The first aspect listed above provides certain advantages over aspects of existing systems that manage virtual resources of a shared computing environment. For example, the one or more programs that record the data and transfer it to NVM (e.g., FIG. 2, 210-220), provide a gradational method of storing a latest virtual resource data for any guest instance on a local memory (e.g., NVM). The latest virtual resource data can be utilized to restore the relevant guest instance. Saving the data on a local NVM, allows the one or more programs to retrieve this data quickly and thus, restore the instances in a limited amount of time. Hence, embodiments of the present invention optimize the recovery or restoration of an instance's virtual resource (e.g., a virtual Ethernet interface assigned to an instance, such as a VM or a container, in a cloud computing environment). As instance's resources (i.e., virtual resources) must be active to access the resources of a shared computing environment, such as a cloud computing environment, limiting downtime through fast and accurate resource restoration ensures continuity of service, efficiency, and data integrity within the computing environment.

The second aspect listed above also provides certain advantages over aspects of existing systems that manage virtual resources of a shared computing environment. Because the one or more programs enable a faster reboot of VMs by reading data written to NVM and utilizing the data to perform a system recovery (i.e., reboot) by applying the data to the VMM (e.g., FIG. 2, 230), the one or more programs enable the retrieval of virtual resource configuration data from local memory, instead of retrieving data from a centralized resource manager, as is the case in some existing shared computing and cloud computing environments. Additionally, the one or more programs enable the restoration or recovery of an existing instance's virtual resource on the same computing host upon which it was initiated.

Figure 3:
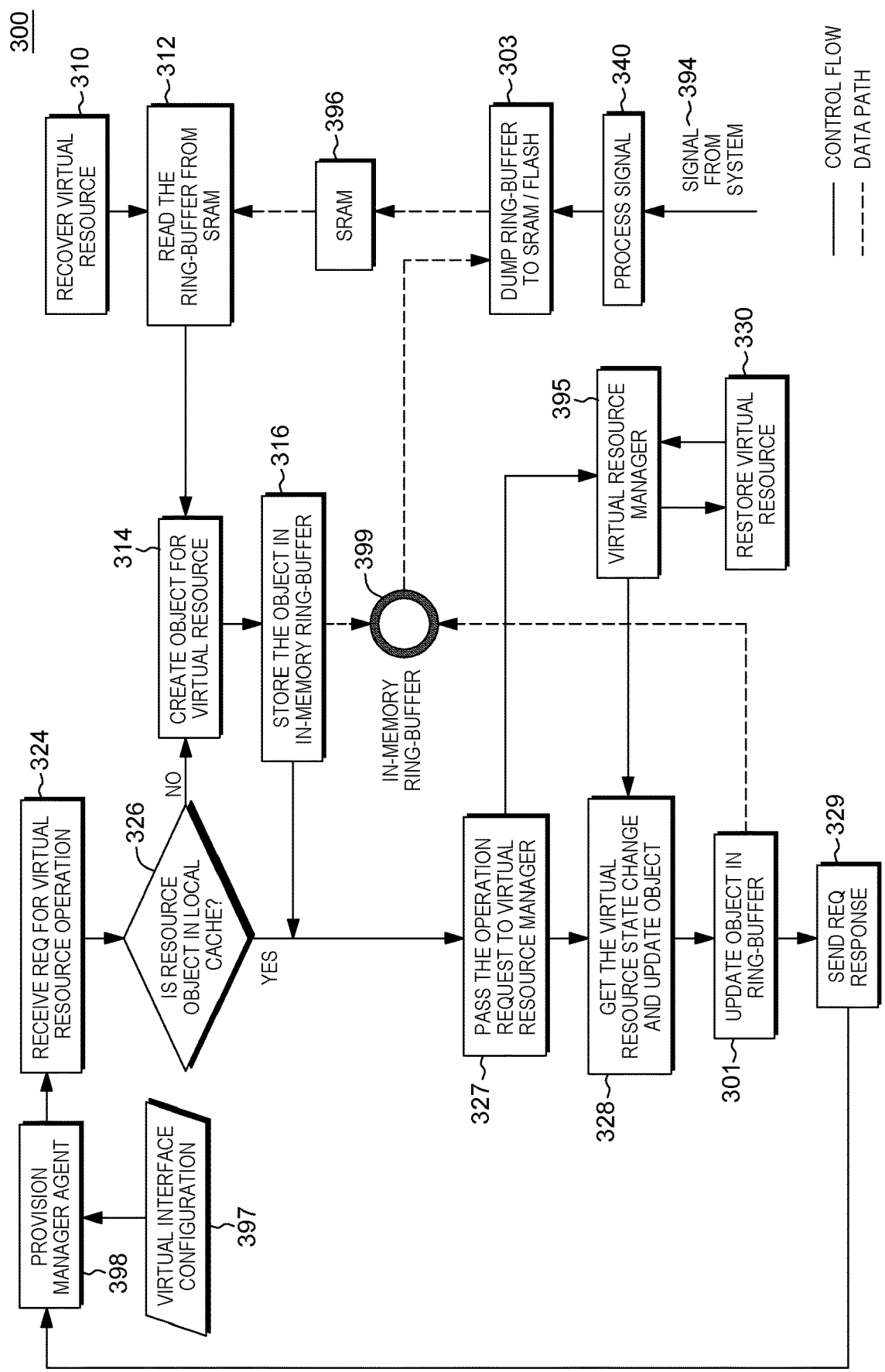
FIG. 3 is a workflow illustrating certain aspects of an embodiment of the present invention.

FIG. 3 is a detailed workflow 300 that illustrates aspects of the storage and recovery of a virtual configuration by one or more programs in some embodiments of the present invention. For illustrative purposes, certain specific types of memory are given as non-limiting examples in order to clarify this functionality. Although FIG. 3 illustrates the restoration of an object utilizing aspects of embodiments of the present invention, these aspects are applicable to the restoration of multiple objects simultaneously or consecutively. For example, an object may comprise a container and a container may be a parent container to multiple child containers and/or virtual workloads (e.g., VMs).

Referring to FIG. 3, in some embodiments of the present invention, one or more programs begin recovery of a virtual resource (310). The one or more programs, in order to recover a configuration of the virtual resource, read a ring-buffer from static random-access memory (SRAM) 396 (312). As illustrated, the configuration data is available from the SRAM 396 because one or more programs update an object in the ring-buffer 399 (301) and one or more programs dump the object data from the ring-buffer 399 to the SRAM 396 (303). The one or more programs dump the object (303) based on receiving a signal 394 processed by one or more programs (340). Based on the processing, the one or more programs determine that the signal 394 indicates a system failure or a system reboot (340), triggering the dump (303). Based on reading the configuration of the virtual resource from the SRAM 396, the one or more programs create an object for the virtual resource (314). The one or more programs store the object in the in-memory ring buffer 399 (316).

In some embodiments of the present invention, one or more programs receive a request for provisioning of a virtual resource (324). As illustrated in FIG. 3, the request may be received from one or more programs comprising a provision manager agent 398 and these one or more programs access virtual interface configuration data 397, which may be included in the request received by the one or more programs (324). Upon receiving the request, the one or more programs determine if the resource object is in a local cache (326).

If the resource object is not in the local cache, the one or more programs create an object for the virtual resource (314) and store the object in the in-memory ring buffer 399 (316). One or more programs dump the object from the in-memory ring buffer 399 to the SRAM 396 (303). One or more programs read the object data, which was originally written to the ring-buffer 399, from the SRAM 396 (312).

Alternatively, if the resource object is in the local cache, the one or more programs pass the request for provisioning of a virtual resource to one or more programs comprising a virtual resource manager 395 (e.g., a hypervisor) (327), to restore the virtual resource (330). Once the virtual resource has been provisioned by the virtual resource manager, the one or more programs obtain any state changes and any updates to the object relevant to the resource (328). The one or more programs update the object in the in-memory ring buffer 399 to reflect the changes and updates (301). Because the one or more programs continuously update the object in the in-memory ring buffer 399 (301) and the one or more programs dump data to the SRAM (303), to recover this virtual resource (310), one or more programs may read this updated object data (originally written to the in-memory ring-buffer 399) from the SRAM 396 (312), in order to create an object for the virtual resource (314) as part of recovering the virtual resource (310). Thus, the one or more programs recover a most recent version of the virtual resource.

As illustrated in FIG. 3, the one or more programs pass the request for provisioning of a virtual resource to or more programs comprising a virtual resource manager 395 (e.g., a hypervisor) (327). However, one or more programs may restore a virtual resource (330) by utilizing the virtual resource manager 395. The one or more programs may obtain state changes (328) for updating the object (301) in the in-memory buffer-ring 399 from the virtual resource manager 395.

In some embodiments of the present invention, upon updating an object in the in-memory buffer-ring 399 (301), the one or more programs send a requisition request to the provision manager agent 398 of the shared computing environment (329). As discussed above, one or more programs receive the request, through the provision manager agent 398, which is communicatively coupled to a resource with virtual interface configuration data 397, and checks the local cache for the relevant object (326).

Embodiments of the present invention include a computer-implemented method, a computer-program product, and a computer system that include one or more programs that progressively record data modifications to an object, where the object is selected from the group consisting of a virtual resource and a container, in a shared computing environment, in an in-memory resource of the shared computing environment. Based on receiving an indication of a system failure or a system reboot, the one or more programs write the data modifications to a non-volatile storage resource, where the non-volatile storage resource is readable by an object manager communicatively coupled to the non-volatile storage resource, and where the object manager utilizes the data modifications to recover the object at reboot following the system failure. In some embodiments of the present invention, the object includes a container in a container instance network. In some embodiments of the present invention, the object manager includes a hypervisor.

In some embodiments of the present invention, writing the data modifications to the non-volatile storage resource is during a system dump. In some embodiments, the non-volatile storage resource is a non-volatile random-access memory, a flash memory, a magnetoresistive random access memory, or a dynamic random-access memory. In some embodiments, writing the data modifications to the non-volatile storage resource includes pre-processing, by the one or more processors, the data modifications to remove redundant records.

In some embodiments of the present invention, the hypervisor replays the data modifications from the non-volatile storage resource after a system reboot to reboot the object.

In some embodiments of the present invention, the one or more programs apply the data modifications from the non-volatile storage resource to the object manager. The object may be a virtual machine and the object manager may be a virtual machine manager.

In some embodiments of the present invention, the one or more programs apply the data modifications from the non-volatile storage resource to a driver of the object manager. This object manager may utilize the driver, to restore the object.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present a VMM, such as Docker 140 (FIG. 1) is executed on one or more modules, including cloud computing modules, and a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
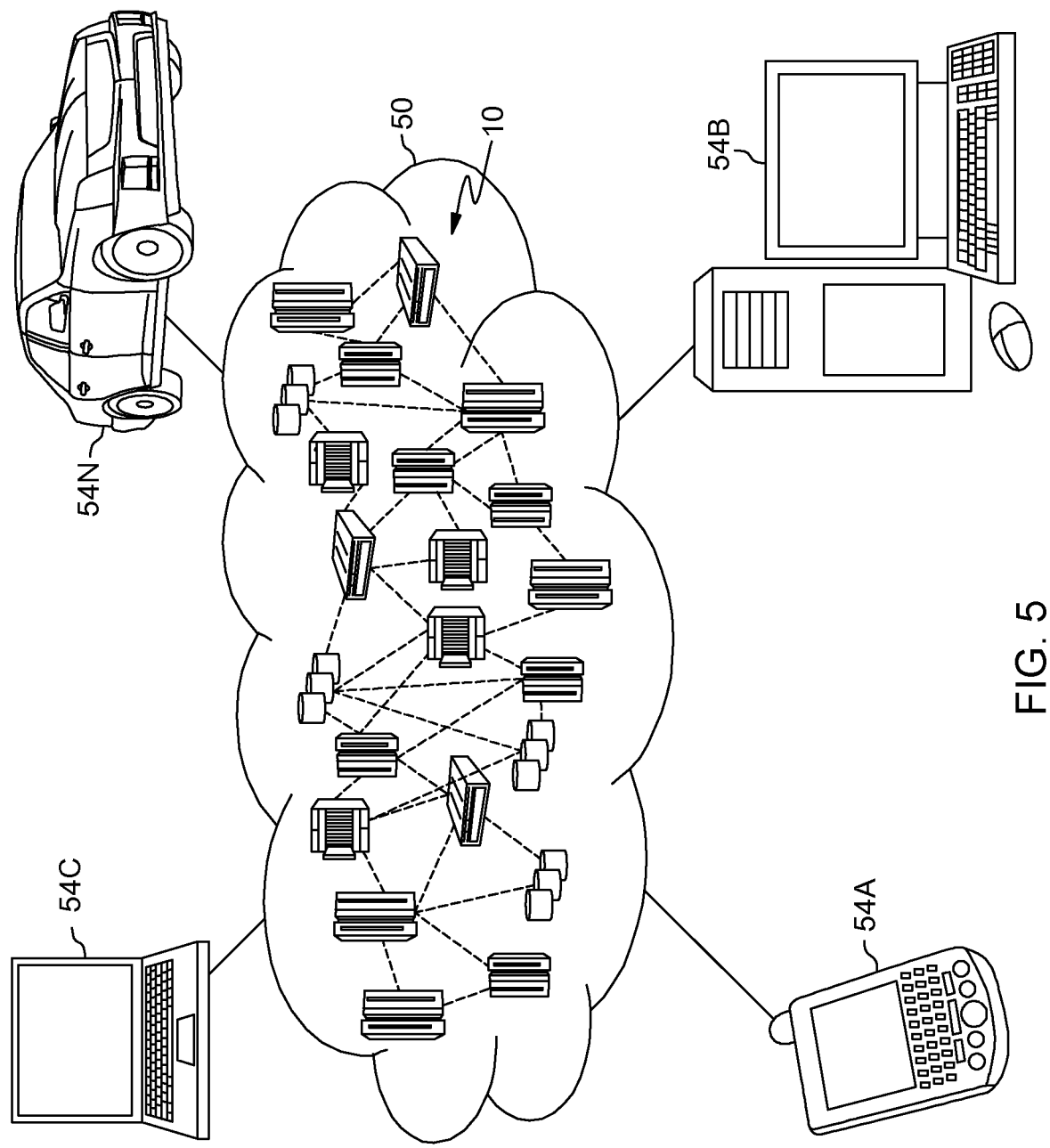
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
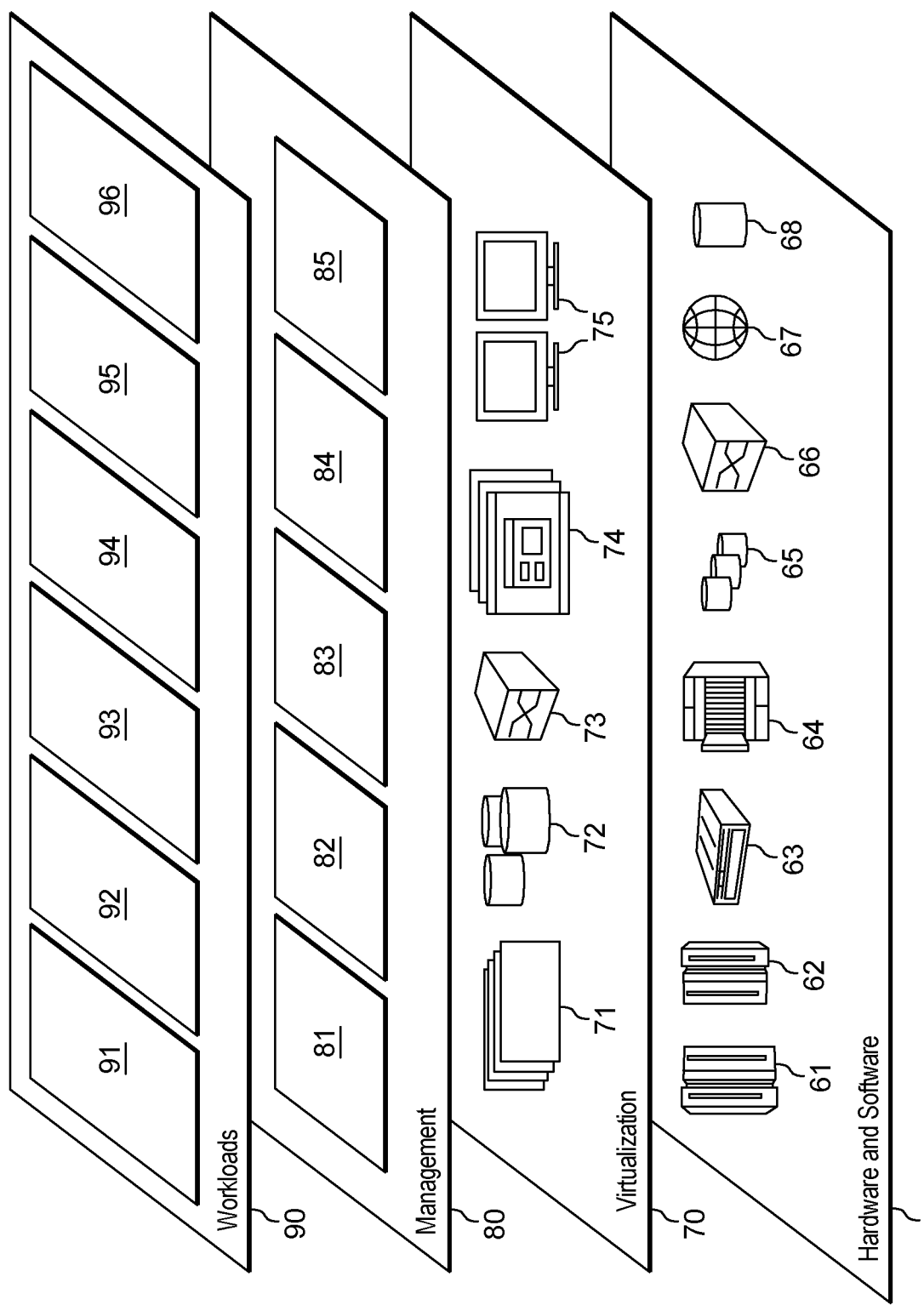
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and provisioning virtual machines 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    progressively recording, by one or more processors, data modifications to a virtual workload, in a shared computing environment, in an in-memory resource of the shared computing environment; and
    based on receiving an indication of a system failure or a system reboot, writing, by the one or more processors, the data modifications to a non-volatile storage resource, wherein the non-volatile storage resource is readable by a hypervisor communicatively coupled to the non-volatile storage resource, and wherein the hypervisor utilizes the data modifications to recover a most recent version of the virtual workload at reboot following the system failure, based on the progressively recording.

2. The computer-implemented method of claim 1, wherein writing the data modifications to the non-volatile storage resource is during a system dump.

3. The computer-implemented method of claim 1, wherein the non-volatile storage resource is selected from the group consisting of: a non-volatile random-access memory, a flash memory, a magnetoresistive random access memory, and a dynamic random-access memory.

4. The computer-implemented method of claim 1, wherein writing the data modifications to the non-volatile storage resource comprises pre-processing, by the one or more processors, the data modifications to remove redundant records.

5. The computer-implemented method of claim 1, further comprising:
    replaying, by the hypervisor, the data modifications from the non-volatile storage resource after a system reboot to reboot the object.

6. The computer-implemented method of claim 1, further comprising:
    applying, by the one or more processors, the data modifications from the non-volatile storage resource to the object manager.

7. The computer-implemented method of claim 6, wherein the object comprises a virtual machine and the object manager comprises a virtual machine manager.

8. The computer-implemented method of claim 1, further comprising:
    applying, by the one or more processors, the data modifications from the non-volatile storage resource to a driver of the hypervisor; and
    utilizing, by the hypervisor, the driver, to restore the virtual workload.

* * * * *